United States Patent
Nakagawa et al.

(10) Patent No.: US 7,576,494 B2
(45) Date of Patent: Aug. 18, 2009

(54) HIGH VOLTAGE DISCHARGE LAMP LIGHTING METHOD, LIGHTING APPARATUS AND IMAGE DEVICE USING THAT LIGHTING APPARATUS

(75) Inventors: Atuji Nakagawa, Himeji (JP); Toshitaka Fujii, Himeji (JP); Hisao Furukawa, Himeji (JP); Kouichi Odani, Himeji (JP)

(73) Assignee: Phoenix Electric Co., Ltd., Himeji-shi (JP)

( * ) Notice: Subject to any disclaimer, the term of this patent is extended or adjusted under 35 U.S.C. 154(b) by 533 days.

(21) Appl. No.: 10/596,184

(22) PCT Filed: Sep. 28, 2004

(86) PCT No.: PCT/JP2004/014155

§ 371 (c)(1),
(2), (4) Date: Jun. 2, 2006

(87) PCT Pub. No.: WO2005/055674

PCT Pub. Date: Jun. 16, 2005

(65) Prior Publication Data

US 2007/0159445 A1    Jul. 12, 2007

(30) Foreign Application Priority Data

Dec. 5, 2003    (JP) .............................. 2003-407385

(51) Int. Cl.
*H05B 37/02* (2006.01)
(52) U.S. Cl. ..................... 315/105; 315/106; 315/107
(58) Field of Classification Search ................... 315/94, 315/105, 106, 107, 291
See application file for complete search history.

(56) References Cited

U.S. PATENT DOCUMENTS 5,055,742 A * 10/1991 Jurell et al. ................... 315/94
5,990,633 A * 11/1999 Hirschmann et al. ........ 315/289

* cited by examiner

*Primary Examiner*—David Hung Vu
(74) *Attorney, Agent, or Firm*—Lucas & Mercanti, LLP

(57) ABSTRACT

The present invention applies to provide a lighting method of a high pressure discharge lamp dedicated particularly for image equipments in which re-lighting when turning ON the switch again immediately after the switch OFF is instantaneously performed even in the high pressure discharge lamp. In the transition state of transitioning from the lighted state to light off, the lamp power to be supplied to the electrodes (3), (4) is reduced to an extent an arc discharge does not disappear and maintained for a while, and thereafter, transitioned to the glow discharge after lowering the lamp temperature to a temperature capable of maintaining the glow discharge and maintaining the glow discharge for a while, and the current supply to the electrodes (3), (4) is cut at the point the lamp temperature becomes lower than or equal to the temperature at which re-lighting is possible.

13 Claims, 5 Drawing Sheets

(a)

(b)

(a)

(b)

HIGH VOLTAGE DISCHARGE LAMP LIGHTING METHOD, LIGHTING APPARATUS AND IMAGE DEVICE USING THAT LIGHTING APPARATUS

TECHNICAL FIELD

The present invention relates to a lighting method and a lighting device of a high pressure discharge lamp for image equipment capable of instantaneously reproducing images on a screen when the switch is turned ON again during the transition state from switch OFF until the high pressure discharge lamp reaches an equilibrium temperature, and capable of reproducing images on the screen in a short period of time of a few seconds after the light of the high pressure discharge lamp is turned out; and an image equipment using the lighting device.

BACKGROUND ART

The high pressure discharge lamp (1) having a short arc length is used as a light source for business or general image equipment (including general household appliance) such as a projector or a rear projection television. However, when used as the light source of such equipment, in turning the light of the high pressure discharge lamp (1) out after stable lighting and then turning the light on again, the lamp temperature (generally about 900° C.) must be lowered to a predetermined temperature (=temperature at which re-lighting is possible [generally 400° C. when applying the high pulse starting voltage of 15 kV as a starter lighting voltage]), and the waiting time (t1) from light off to re-lighting is long or 30 seconds, for example, even when the high voltage pulse starting voltage of 15 kV is applied as the starter lighting voltage [FIG. 3(b)]. The block circuit diagram for such case is shown in FIG. 3(a).

In the image equipment using the high pressure discharge lamp (1) as the light source, the length of the waiting time (t1), (i.e., time from light off to re-lighting) is not practically a problem for equipment which are continuously being used. However, the length of the waiting time (t1) of about 30 seconds becomes a large problem for image equipment that repeat switch ON and switch OFF in a short period of time, in particular, a general household appliance such as a rear projection television. That is, in the present normal television, the image appears on the screen at the same time as switch ON, and the image disappears from the screen at the same time as switch OFF. The user already has a preconceived idea that a television works in such manner.

Naturally, this performance is also required for the projection television, and if the image does not appear on the screen substantially at the same time as switch ON, the user may feel that something is wrong in the projection television (e.g., sense that the performance is inferior to the conventional television), and may be a problem regarding the quality of the projection television. The length of the above mentioned waiting time (t1) cannot be of any length as long as the high pressure discharge lamp (1) is used as the light source, and it was impossible to re-light the high pressure discharge lamp (1) at the same time (at least after a short period of time of a few seconds after light off) as switch ON immediately after light off to have the image appear on the screen even if a high voltage igniter that can apply a high voltage pulse of 10 kV to 15 kV is provided as a lighting starter circuit (20). Particularly, it was impossible when the starting voltage was made to a low direct current voltage of 1 kV to 4 kV (this advantage is to be hereinafter described).

Having the high pulse starting voltage to be 30 kV or higher as a method for instantaneous re-lighting is conventionally known, but in such case, the width of the high voltage pulse is usually narrow of 50 to 400 nS, and thus becomes an impulse noise source having high frequency components, and a cause of malfunction of the main equipment itself or the peripheral devices adopting high voltage pulse as the starting voltage. Thus, a serge measure or a malfunction measure was required as display equipment.

In view of the above problems, a lighting method (including circuit) is desired for the image equipment that can have as low as possible starting voltage, for example, as low as 1 kV to 4 kV, and that has satisfactory re-lighting ability after light off.

Other problems relating to turn on the high pressure discharge lamp (1) includes production of mercury bridge between electrodes (3) and (4) after light off. Particularly, an excessive amount of mercury with respect to the volume is enclosed in a light emitting tube (12) of the recent high pressure discharge lamp (1). In such high pressure discharge lamp (1), the mercury attaches to the electrodes (3), (4) in condensed form in the cooling process of the high pressure discharge lamp (1) after light off, which when formed in a gap between the electrodes (3) and (4), short circuits the electrodes (3), (4) and becomes the mercury bridge that inhibits re-lighting.

The related patent document with respect to the present inventions described in claims 1, 5 includes the invention disclosed in JP 2002-289379 of the inventors of the present application.

Patent Document 1: JP 2002-289379

DISCLOSURE OF THE INVENTION

The present invention was invented in view of the above problems of the conventional art, aims firstly, to provide a lighting method of a high pressure discharge lamp particularly dedicated to image equipment when the switch is turned ON again immediately after switch OFF despite being the high pressure discharge lamp, the return from the transition state (state before the light of the high pressure discharge lamp is completely turned out) immediately after switch OFF to a stable discharging state is instantaneously carried out and re-lighting by turning ON the switch again after turning off the light of the high pressure discharge lamp is carried out in a short period of time of a few seconds, which is not possible in the conventional art, secondly, to provide a lighting circuit that performs the lighting method as above described, particularly, the lighting circuit that performs re-lighting in a short period of time without applying excessive high voltage pulse starting voltage to the high pressure discharge lamp, and thirdly, to provide an image equipment that uses such light circuit and in which the return from the transition state immediately after the light is turned off to the stable arc discharging state is instantaneously carried out, and in which re-lighting by turning ON the switch after light off is performed in a short period of time or a few seconds, which is not possible in the conventional art.

"Claim 1" relates to the first embodiment of the lighting method of a high pressure discharge lamp (1) and is characterized in that "in a transition state of making transition from a lighted state to light off, a lamp current to be supplied to electrodes (3), (4) is reduced to an extent an arc discharge is not extinguished so that a lamp temperature reaches an equilibrium temperature and the current supply to the electrodes (3), (4) is cut at the point the lamp temperature reaches the equilibrium temperature."

Therefore, when the switch is turned ON again immediately after light off, and the high pressure discharge lamp (1) must be re-lighted between transition states until the lamp temperature reaches the equilibrium temperature, the arc discharge between the electrodes (3) and (4) is instantaneously recovered and the stable lighting state is recovered if the lighting current is flowed again since the reduced current is supplied to the electrodes (3), (4) at this point and the arc discharge is not distinguished.

Even if the arc discharge is scantly continued in the transition state, the lamp temperature gradually lowers and reaches the equilibrium temperature after a predetermined time. When the temperature is reached the equilibrium, the current supply to the electrodes (3), (4) is cut, whereby the lamp temperature lowers and the lamp temperature reaches the temperature at which re-lighting is possible. If the switch is turned ON at this point, the insulation breakage is produced between the electrodes (3) and (4) by a normal means, that is, by applying the voltage of starting the light between the electrodes (3) and (4) and then supplying the lighting current to transition to stable lighting. The waiting time (t1) from light off to re-lighting is only about five seconds, which is significantly shorter than in conventional art (about 30 seconds).

When the high pressure discharge lamp (1) is applied to be used in general household electronic appliances such as a rear projection television (50) (not limited thereto), if the user switches OFF the rear projection television (50) and switches ON right during the transition state, the high pressure discharge lamp (1) instantaneously returns to its original brightness and the image appears on the screen (S). Further, even if switched ON in the light off state after the transition state has elapsed, re-lighting can be performed in a few seconds, and is thus not inferior to conventional television and the user will not feel that something is wrong.

In the transition state from the lighted state to light off, if the arc is scantly produced between the electrodes (3) and (4), the electrodes (3), (4) itself are maintained at greater than or equal to the evaporation temperature of the mercury, and thus mercury does not condensate even if the mercury vapor contacts the surface of the electrodes (3), (4). Since the sealed bulb (11) itself is cooled, the mercury vapor that has contacted the inner surface of the light emitting tube (12) starts to condense at the inner surface of the light emitting tube (12), and as it grows, gradually reduces the vapor pressure of mercury in the light emitting tube (12).

When the vapor pressure of mercury in the light emitting tube (12) is sufficiently reduced, the supply of current to the electrodes (3), (4) is cut, so that the residual mercury vapor in the light emitting tube (12) condenses thereafter. Even if a part of which attaches to the electrodes (3), (4), such amount is extremely small, and thus the generation of the mercury bridge is 100% resolved, and does not become a problem in re-lighting after light off.

"Claim 2" relates to a lighting method of a high pressure discharge lamp (1) used as a light source of an image equipment (A), and is characterized in that "in a transition state of making transition from a lighted state to light off, a state in which an image does not appear on a screen (S) is obtained by switching OFF the image equipment (A), and the power to be supplied to the high pressure discharge lamp is reduced to an extent an arc discharge is not extinguished and maintained until a lamp temperature reaches an equilibrium temperature, and the current supply to the electrodes (3), (4) is cut at a point the lamp temperature reaches the equilibrium temperature".

In the transition state after switch OFF of the image equipment (A), the high pressure discharge lamp (1) is lighted with an amount of light of a certain extent when the arc of the high pressure discharge lamp (1) is in the non-extinguished state, but by having the screen (S) of the image equipment (A) in a state in which the image does not appear (e.g., black state in which the image element (65R), (65G), (65B) does not transmit the white light from the high pressure discharge lamp (1)), the light from the high pressure discharge lamp (1) does not exit from the screen (S) and a state as if switched OFF appears. When the switch is turned ON again in the transition state, the arc discharge of the high pressure discharge lamp (1) instantaneously returns to the stable lighting state in a short period of time, and is not inferior to conventional television. The image appears again on the screen (S) and the user does not need to wait. When the switch is turned ON again in the light off state after the transition state, the image can appear again on the screen (S) with the waiting time (t1) of about five seconds.

"Claim 3" relates to a reducing amount of the lamp power in the lighting method of the high pressure discharge lamp (1), characterized in that "the reducing amount of the lamp power is ½ to 1/20 of the rated power". If the lamp power of such extent is supplied, the arc discharge is maintained at the cooled state by the normal fan (not shown in figures) with respect to the high pressure discharge lamp (1) and the lamp temperature is gradually reduced, and finally reaches the temperature at which re-lighting is possible (generally, about 400° C. for high pulse voltage having the starting application voltage of 10 kV to 15 kV, about 350° C. for low direct current voltage having the starting application voltage of 1 kV to 4 kV [see FIG. 1(b)].

"Claim 4" relates to a specific time for reducing the lamp power executed in the lighting method of the high pressure discharge lamp (1), and is characterized in that "the reduction time (t2) of the reduced lamp power is greater than or equal to 60 seconds". The temperature at which re-lighting is possible of the high pressure discharge lamp (1) is generally said to be about 400° C. (for high voltage of 10 kV to 15 kV) to 330° C. (for low voltage of 1 kV to 4 kV) depending on the starting application voltage in re-lighting. The reduction time (t2) from the start of reduced lamp power by the switch OFF to the equilibrium temperature (=quantity of heat supplied from the arc discharge generated by reduced lamp power, temperature at which the quantity of heat diffused from the surface of the high pressure discharge lamp (1) becomes equilibrium to an extent) is not constant due to capacity of high pressure discharge lamp (1), cooling etc., but experimentally, reaches the equilibrium temperature in greater than or equal to 60 seconds. Therefore, the high pressure discharge lamp (1) defines the reduction time (t2) of the reduced lamp power by having the time as parameter and timing with a timing means such as a timer, and recognize the equilibrium temperature from analogy from the temperature gauge (not shown) arranged in a lamp housing (not shown) or a concave reflecting mirror (2) accommodating the high pressure discharge lamp (1).

"Claim 5" relates to a second embodiment of a lighting method of a high pressure discharge lamp (1) of the present invention and is characterized in that "a lamp power to be supplied to electrodes is reduced to an extent an arc discharge is not extinguished and maintained for a predetermined period of time (t2) thereby lowering the lamp temperature to a level at which glow discharge becomes possible. Thereafter, when the lamp temperature is lowered to the level at which the glow discharge is possible, transition to the glow discharge occurs and the glow discharge is maintained for a while for a predetermined period of time (t3). If the lamp temperature is further lowered, the current supply to the electrodes (3), (4) is cut at the level at which instantaneous re-lighting is possible".

In this manner, when the high pressure discharge lamp (1) must be re-lighted during the transition state until light off, the reduced current is supplied to the electrodes (3), (4) and the arc discharge is not eliminated, or the following glow discharge is maintained at this point, and thus the arc discharge between the electrodes (3) and (4) is instantaneously returned and the stable lighting state is returned by simply flowing the lighting current again.

On the contrary, when not re-lighting during the transition state until light off, the lamp temperature gradually lowers since the heat diffusion amount from the high pressure discharge lamp (1) is greater than the generation of heat by the arc discharge even if the arc discharge is scantly continued at the first half of the transition state. Thus, the pressure of inside the lamp also lowers. Transition to the glow discharge occurs when the lamp temperature reaches the temperature capable of glow discharge. If the current supply to the electrodes (3), (4) is cut at the point the lamp temperature is rapidly reduced after a predetermined time (t3), the lamp reaches the temperature at which re-lighting is possible even with the low direct current starting voltage of about 2.4 kV. If the switch is turned ON at this point, re-lighting is possible with the waiting time (t1) from light off to re-lighting in only a few seconds, which is significantly shorter compared to the conventional art (about 30 seconds).

When only the reduced power is used and the glow discharge is not involved, the time required for reducing the lamp temperature is long, and the equilibrium temperature do not sufficiently lower and thus is rather difficult for instantaneous re-lighting at about 2.4 kV. By making transition to the glow discharge at an appropriate timing as in the present invention, the lamp temperature can be rapidly lowered while maintaining discharge. According to such method, even if the high pressure discharge lamp (1) in the concave reflecting mirror (2) is in a sealed state and the lamp is difficult to cool, the lamp temperature can be effectively lowered in a short period of time while maintaining discharge, and instantaneous re-lighting becomes possible even after light off.

When the high pressure discharge lamp (1) is applied to be used in general household electronic appliances such as a rear projection television (50) (not limited thereto), if the user switches OFF the rear projection television (50) and switches ON right during the transition period of the high pressure discharge lamp (1), the high pressure discharge lamp (1) instantaneously starts to rise and returns to its original brightness and the image appears on the screen (S). Further, even if switched ON in the light off state after the transition state has elapsed, re-lighting can be performed in a few seconds, and is thus not inferior to conventional television and the user will not feel that something is wrong.

In the transition state from the lighted state to light off, if the arc (include glow discharge) is scantly produced at the electrodes (3), (4), the electrodes (3), (4) itself are maintained at greater than or equal to the evaporation temperature of the mercury, and thus mercury does not condensate even if the mercury vapor contacts the surface of the electrodes (3), (4). Since the sealed bulb (11) itself is cooled, the mercury vapor that has contacted the inner surface of the light emitting tube (12) starts to condense at the inner surface of the light emitting tube (12), and as it grows, gradually reduces the vapor pressure of mercury in the light emitting tube (12).

When the vapor pressure of mercury in the light emitting tube (12) is sufficiently reduced, the supply of current to the electrodes (3), (4) is cut, so that the residual mercury vapor in the light emitting tube (12) condenses thereafter. Even if a part of which attaches to the electrodes (3), (4), such amount is extremely small, and thus the generation of the mercury bridge is 100% resolved, and does not become a problem in re-lighting after light off.

"Claim 6" relates to a lighting method of the high pressure discharge lamp (1) used as a light source of an image equipment (A) being characterized in that "in a transition state of making transition from a lighted state to light off, a state in which an image does not appear on a screen (S) is obtained by switching OFF an image equipment (A), and the lamp power is reduced to an extent an arc discharge is not extinguished and maintained for a while (period (t2)) and thereafter transitioned to a glow discharge and maintained for a while (period (t3)), and the current supply to the electrodes is cut".

In the first half of the transition state after switch OFF of the image equipment (A), the high pressure discharge lamp (1) is lighted with an amount of light of a certain extent when the arc of the high pressure discharge lamp (1) is in the non-extinguished state, but by having the screen (S) of the image equipment (A) in a state in which the image does not appear (e.g., black state in which the image element (65R), (65G), (65B) does not transmit the white light from the high pressure discharge lamp (1)), the light from the high pressure discharge lamp (1) does not exit from the screen (S) and a state as if switched OFF appears. When the switch is turned ON again in the transition state, the arc discharge of the high pressure discharge lamp (1) instantaneously returns to the stable lighting state in a short period of time, and is not inferior to the television of conventional art. The image appears again on the screen (S) and the user does not need to wait. When the switch is turned ON again in the light off state after the transition state, the image can appear again on the screen (S) with the waiting time (t1) of about five seconds.

"Claim 7" relates to a reducing amount of the lamp power in the lighting method of the high pressure discharge lamp (1), characterized in that "the reducing amount of the lamp power is ½ to ½₀ of the rated power". If the lamp power of such extent is supplied, the arc discharge is maintained at the cooled state by the normal fan (not shown in figures) with respect to the sealed high pressure discharge lamp (1) with reflecting mirror and the lamp temperature is gradually reduced, and the pressure in the lamp is also reduced. Thus, it reaches an extent the glow discharge is maintained even when made transition to the glow discharge. The glow discharge is maintained for a while, and finally reaches the temperature at which re-lighting is possible (generally, about 400° C. for high pulse voltage having the starting application voltage of 10 kV to 15 kV, about 350° C. for low direct current voltage having the starting application voltage of 1 kV to 4 kV [see FIG. 2(b)].

The reduced power is lowered to a predetermined value at once, and may be made constant at the relevant value, but since the pressure in the lamp reduces with the lowering of the lamp temperature, the arc discharge is maintained at a lower power. Paying attention to such aspect, the power is decreased in a step wise manner or continuously reduced in a range of ½ to 1/20 of the rated output, whereby the lamp temperature is effectively lowered while maintaining the arc discharge. In the region of less than or equal to 1/20, the region is no longer the range of arc discharge and now becomes the region of glow discharge. The reduction of power is insufficient for greater than or equal to ½, and the effect of lowering the temperature is extremely small.

"Claim 8" relates to a specific time of the reduction of the lamp power executed in the lighting method of the high pressure discharge lamp (1), and is characterized in that "the reduction time (t2) of the reduced lamp power is 20 to 240 seconds". This is the time required for lowering the lamp temperature until the glow discharge can be maintained when made transition the glow discharge. The glow voltage of this type of high pressure discharge lamp (1) is normally at the level of 100 to 200 V if the high pressure discharge lamp (1) is cooled. However, since the temperature is high immediately after the light off of the lamp from the rated power and the inner pressure is also high, the glow voltage is greater than or equal to 250 V. The input voltage for rear projection being DC250 V at minimum is a typical condition. In order to maintain the glow discharge, the temperature of the lamp must be lowered until the glow voltage becomes lower than the input voltage. Although it depends on the DC voltage level of the input voltage, the temperature at which the glow discharge can be maintained of the high pressure discharge lamp (1) is about 450° C.

The reduction time (t2) from the start of reducing the lamp power by switch OFF until the equilibrium temperature (temperature at which the quantity of heat supplied from the arc discharge generated by reduction of lamp power and the quantity of heat diffused from the surface of the high pressure discharge lamp (1) becomes equilibrium) is not constant due to capacity of high pressure discharge lamp (1), cooling etc., but experimentally, the high pressure discharge lamp (1) reaches the equilibrium temperature in 20 to 240 seconds. Therefore, the reduction time (t2) of reducing the lamp power can be defined by timing with the timing means such as a timer with the time as the parameter.

"Claim 9" relates to the transition to the glow discharge executed in the lighting method of the high pressure discharge lamp (1), and is characterized in that "the glow discharge maintaining time (t3) is 10 to 120 seconds". The glow discharge is normally in the region of 1 mA to 100 mA, and the glow voltage in this type of high pressure discharge lamp is 100 to 200V. Therefore, the power during glow discharge is 0.1 W to 20 W, and is typically at most 2 W when the glow current is 10 mA. The power of the lamp after transition to the glow discharge thus becomes significantly small, and the temperature of the lamp rapidly lowers.

The temperature at which re-lighting is possible of the high pressure discharge lamp (1) is, although depending on the starting application voltage in re-lighting, generally about 400° C. for the high voltage pulse starting voltage of 10 kV to 15 kV and about 350° C. for the direct current starting voltage of 1 kV to 4 kV. Depending on the capacity of the high pressure discharge lamp (1) and the presence of cooling, the glow discharge time (t3) until reaching the relevant temperature is not constant but is 10 to 120 seconds. This can be timed with timing means such as a timer to define the glow discharge time (t3). The relevant time is 10 seconds for the high voltage pulse of 15 kV of best condition, and 120 seconds for the direct current starting voltage of 1 kV of bad condition.

"Claim 10" relates to a lighting device (C) of a high pressure discharge lamp (1) for performing the method of claim 1 and is characterized by comprising "(a) a lighting starter circuit (20) for starter lighting by applying a high voltage pulse or a low voltage direct current voltage to the high pressure discharge lamp (1); (b) a stable lighting circuit (21), connected to the lighting starter circuit (20), for stably lighting the high pressure discharge lamp (1); (c) a power controller (22) for controlling the power supply from the stable lighting circuit (21) to the high pressure discharge lamp (1); (d) a lamp power reducing circuit (24) for having the power controller (22) control the stable lighting circuit (21) so that a stable supply of the lighting power from the stable lighting circuit (21) to the high pressure discharge lamp (1) is performed in stable lighting, and control the stable lighting circuit (21) so as to lower the lamp power to be supplied to the high pressure discharge lamp (1) to a lamp power of an extent an arc discharge between electrodes (3) and (4) is not extinguished in a transition state when the high pressure discharge lamp (1) makes transition from the stable lighting to light off after switching OFF the image equipment (A); and (e) an optical engine control circuit (23) for outputting an image OFF signal to an optical engine (E) for sending images to a screen so as to have the screen in a state in which the image does not appear at the same time as the switch OFF."

The optical engine (E), which example is as shown in FIG. 4, is configured by the high pressure discharge lamp (1) in the lamp house (Ea), and an optical system including image elements (65R), (65G), (65B) such as a liquid crystal panel, and the image elements (65R), (65G), (65B) are controlled by an image element controller (70). The "state in which the image does not appear" is an switch OFF state in which the image elements (65R), (65G), (65B) are controlled so as to be in a state of not transmitting the light so that the image does not appear on the screen (S).

"Claim 11" relates to a lighting device (C) of a high pressure discharge lamp (1) for performing the method of claim 5 and is characterized by comprising "(a) a lighting starter circuit (20), connected to the high pressure discharge lamp (1), for starter lighting by applying a high voltage pulse starting voltage or a direct current starting voltage to the high pressure discharge lamp (1);

(b) a stable lighting circuit (21), connected to the lighting starter circuit (20), for stably lighting the high pressure discharge lamp (1);

(c) a power controller (22), connected to the stable lighting circuit (21), for controlling the power supply from the stable lighting circuit (21) to the high pressure discharge lamp (1);

(d) a lamp power reducing control circuit (24), connected to the power controller (22), for having the power controller (22) control the stable lighting circuit (21) so that a stable supply of the lighting power from the stable lighting circuit (21) to the high pressure discharge lamp (1) is performed in stable lighting, and control the stable lighting circuit (21) so as to narrow the lamp power to be supplied to the high pressure discharge lamp (1) to a lamp power of an extent an arc discharge between electrodes (3) and (4) is not extinguished in a first half of a transition state when the high pressure discharge lamp (1) makes transition from the stable lighting to light off;

(e) a glow discharge maintaining circuit (26), connected to the high pressure discharge lamp (1), for making transition the high pressure discharge lamp (1) to glow discharge in a second half of the transition state and maintaining the glow discharge after transition; and (f) a glow discharge control circuit (25), connected to the glow discharge maintaining circuit (26), for maintaining the glow discharge and cutting the current supply to the electrodes (3), (4) after maintaining the glow discharge."

"Claim 12" and "Claim 13" relate to the lighting starting voltage in the lighting device (C) of the high pressure discharge lamp (1), where the former is characterized in that "the high voltage pulse to be applied is 10 kV to 15 kV", and the latter is characterized in that "the low voltage direct current voltage to be applied is 1 kV to 4 kV". Similar to the conventional art, the former uses a method of using a high voltage igniter as the lighting starter circuit (20) and the lighting starting voltage is high, and thus re-lighting after light off at the temperature at which re-lighting is possible is facilitated. In other words, the reduction time (t2) can be shortened. In the latter case, the low voltage direct current voltage is continued to be applied, so that the energy necessary for insulation breakage between the electrodes (3) and (4) is supplied in a short period of time and re-lighting after light off is performed without being inferior to when applying the high voltage pulse. The method is thus is the most preferred method for this type of lighting method. However, since the lighting starting voltage is low, the temperature at which re-lighting is possible becomes lower by such extent, and the reduction time (t2) becomes longer than the former case.

The first embodiment of the image equipment (A) equipped with a lighting device (C) and is characterized by comprising "(a) a screen (S) for showing an image; (b) an optical engine (E) for projecting the image on the screen (S); (c) a high pressure discharge lamp (1) for supplying light to the optical engine (E); (d) a lighting starter circuit (20) for applying the starter lighting voltage to the high pressure discharge lamp (1) and a stable lighting circuit (21) for supplying a stable lighting power to the high pressure discharge lamp (1) in stable lighting; and (e) a lamp power reducing control circuit (24) and an optical engine control circuit (23) for controlling the optical engine (E) with switching OFF of the image equipment to have the screen in a state in which an image does not appear for a time (t2) until the high pressure discharge lamp (1) is cooled to a temperature at which re-lighting is possible, and turning OFF the high pressure discharge lamp (1) at a point the high pressure discharge lamp (1) has reached an equilibrium temperature or after elapse of a suitable time (t2) in which the high pressure discharge lamp (1) is assumed to have reached the equilibrium temperature."

The second embodiment of an image equipment (A) equipped with a lighting device (C) is being characterized by comprising "(a) a screen (S) arranged in the image equipment (A) to be projected an image;

(b) an optical engine (E) for projecting the image on the screen (S);

(c) a high pressure discharge lamp (1) for supplying light to the optical engine (E);

(d) a lighting starter circuit (20), connected to the high pressure discharge lamp (1), for applying the starter lighting voltage to the high pressure discharge lamp (1);

(e) a stable lighting circuit (21), connected to the lighting starter circuit (20), for supplying a stable lighting power to the high pressure discharge lamp (1) in stable lighting of the high pressure discharge lamp (1);

(f) a power controller (22), connected to the stable lighting circuit (21), for controlling the power supply from the stable lighting circuit (21) to the high pressure discharge lamp (1);

(g) an optical engine control circuit (23), connected to an optical engine (E), for controlling the optical engine (E) by switching OFF of the image equipment (A) to have the screen (S) in a state in which the image does not appear;

(h) a lamp power reducing circuit (24), connected to the power controller (22), for reducing the lamp power to an extent an arc discharge is not extinguished by cooling the lamp after the switch OFF and maintaining the arc discharge for a while (period t2);

(i) a glow discharge maintaining circuit (26), connected to the high pressure discharge lamp (1), for making transition from the arc discharge by the reduced power to the glow discharge and maintaining the glow discharge; and (j) a glow discharge control circuit (25), connected to the glow discharge maintaining circuit (26), for controlling the glow discharge maintaining circuit (26) and cutting the current supply to the electrodes (3), (4) after maintaining the glow discharge for a while (period t3).

According to such configuration of the image equipment (A), the response similar to the conventional television is ensured regarding re-lighting.

In the present invention, since the arc discharge is maintained in the transition state of making transition from lighted state to light off, the arc discharge is immediately recovered as soon as the switch is turned ON again immediately after light off to return to the stable lighting state, and when used as a light source of a general household electronic appliance, allows the image to appear on the screen, similar to the television when switched ON immediately after switch OFF.

In the transition state of making transition from the lighted state to light off, since the screen is in a state in which an image does not appear by switching OFF the image equipment, the image does not appear even if a weak light is emitted from the high pressure discharge lamp in the transition state, and thus a state as if switched OFF appears. When the switch is turned ON in such transition state, the image appears again on the screen in a short period of time, similar to the conventional television as described above.

Further, in the second embodiment, in the transition state of making transition from the lighted state to light off, the arc discharge is maintained for a while at reduced power and the glow discharge is maintained thereafter. Thus, even if the switch is turned ON again immediately after the switch OFF, not only does the arc discharge immediately recover and return to the stable lighting state, but re-lighting is possible instantaneously even after light off of the lamp. Therefore, when used as a light source of a general household electronic appliance such as a rear projection television, the image can appear on the screen any time similar to the television.

Moreover, since instantaneous re-lighting is possible at the low direct current starting voltage, the influence of the noise on the circuits is reduced and the countermeasures for malfunction are facilitated. Further, by actively using the glow discharge, the time of the transition time of making transition from the lighted state to light off is effectively reduced.

In addition, since the lamp power is significantly low, the image does not appear even if a weak light is emitted from the high pressure discharge lamp, and a state as if switched OFF is obtained in the period (t3) of glow discharge, the image is barely recognized even if not in the state in which the screen is a black screen and the image equivalently does not appear thereon, and thus the image only needs to be a black screen during the period of reduced power.

EXPLANATION OF THE MARKS (A) IMAGE EQUIPMENT
(C) LIGHTING CIRCUIT
(E) OPTICAL ENGINE
(1) HIGH PRESSURE DISCHARGE LAMP
(2) CONCAVE REFLECTING MIRROR
(3) ELECTRODE
(4) ELECTRODE
(12) LIGHT EMITTING TUBE

BEST MODE FOR CARRYING OUT THE INVENTION

Figure 1:
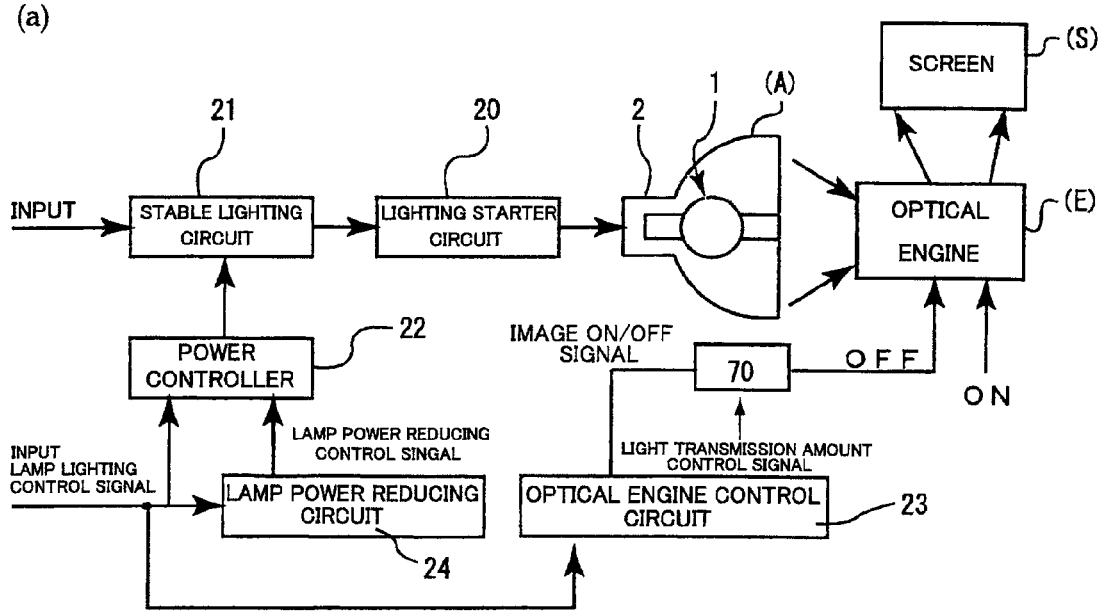
FIG. 1 is a block circuit diagram of a lighting device (first embodiment) applied with the present invention.
Figure 1:
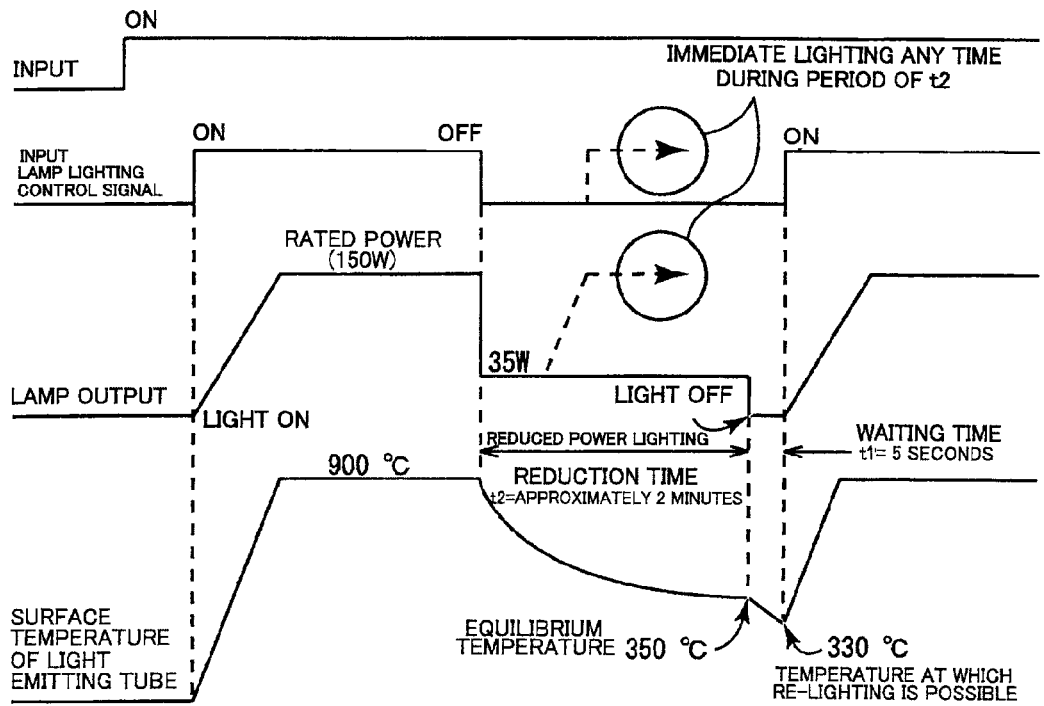

The first embodiment of the present invention will now be described in detail. FIG. 1 is a schematic cross sectional view of a high pressure discharge lamp (1) applied with the lighting method of the present invention and a block diagram of an application lighting circuit (C), where the high pressure discharge lamp (1) is attached to the concave reflecting mirror (2). The high pressure discharge lamp (1) is either for direct current lighting or for alternating current lighting.

The circuit of the lighting device (C) is configured by a lighting starter circuit (20), a stable lighting circuit (21), a power controller (22), a lamp power reducing circuit (24) and an optical engine control circuit (23).

The lighting starter circuit (20) is such as a low voltage circuit that generates a low voltage direct current voltage of about 1 kV to 4 kV and having such voltage as the lighting starting voltage, or a high voltage circuit that generates a high voltage pulse of 10 kV to 15 kV and having such voltage as the lighting starting voltage.

The stable lighting circuit (21) is a circuit, connected to the lighting starter circuit (20), for stably lighting the high pressure discharge lamp (1) in stable lighting and lowering the lamp power to be supplied to the high pressure discharge lamp (1) in the transition period of making transition from stable lighting to light off (see FIG. 1(a)).

The power controller (22) is a circuit that controls the stable lighting circuit (21) so that the supply of lighting power from the stable lighting circuit (21) to the high pressure discharge lamp (1) stabilizes, and the lamp power to be supplied to the high pressure discharge lamp (1) lowers in the transition period of making transition from the stable lighting to light off.

The lamp power reducing circuit (24) and the optical engine control circuit (23) are circuits that control the optical engine (E) for time (t2) until the high pressure discharge lamp (1) reaches an equilibrium temperature by switching OFF the image equipment (A) to obtain a state in which an image does not appear on the screen (S), that turn OFF the high pressure discharge lamp (1) at the point the high pressure discharge lamp (1) reaches the equilibrium temperature or after the suitable time (t2) in which the high pressure discharge lamp (1) is assumed to have reached the equilibrium temperature has elapsed, and that control the power controller (22) and the optical engine (E), respectively, so as to restore the lamp power to the stable lighting state when the switch of the image equipment (A) is turned ON again and to output the image from the optical engine (E).

The power controller (22) is input with a lamp lighting control signal (include ON, OFF) for performing ON/OFF control of the high pressure discharge lamp (1), and a lamp power reducing control signal for controlling the stable lighting circuit (21) so as to lower the output power to be supplied to the high pressure discharge lamp (1) to the reduced lamp power of an extent the arc discharge between the electrodes (3) and (4) is not extinguished in the transition state from the stable lighting to light off.

Figure 4:
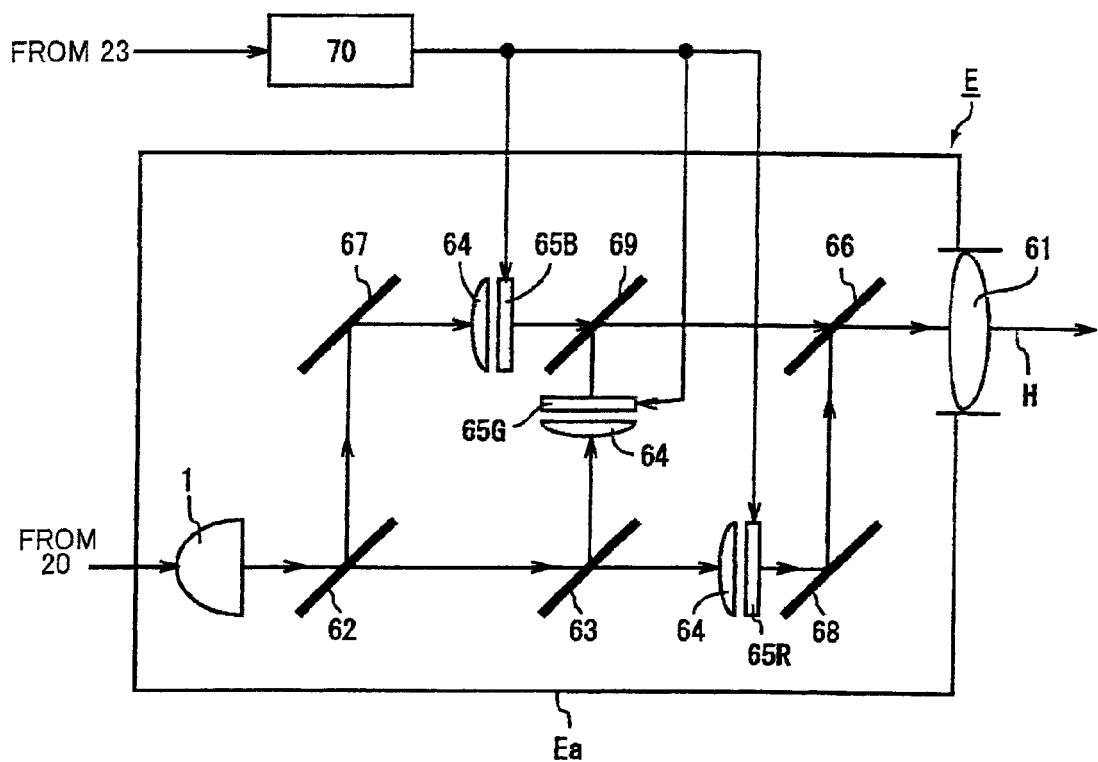
FIG. 4 is a schematic view of an optical engine used in the present invention.

The optical engine (E) is not limited to that illustrated in the present embodiment and may take various other forms. FIG. 4 shows an exemplary optical engine. The optical engine (E) includes the high pressure discharge lamp (1) with concave reflecting mirror (2), color separation optical system, projection lens (61) and the like in the lamp house (Ea). The white light emitted from the high pressure discharge lamp (1) with concave reflecting mirror (2) is separated into three colors of red (R), green (G), blue (B) by means of dichroic mirrors (62), (63), and each color of red (R), green (G), blue (B) enters an image element (65R), (65G), (65B) such as a liquid crystal panel through a condensing lens (64). The light transmissivity of the image element (65R), (65G), (65B) is changed according to each image signal from an image element controller (70) to block or transmit each color of red (R), green (G), blue (B) that has entered the image element (65R), (65G), (65B), and the colored light (H) is emitted from the projection lens (61). Reference numerals (67), (68) are total reflection mirrors, and reference numerals (69), (66) are dichroic mirrors (semi-transmissive mirror).

Figure 5:
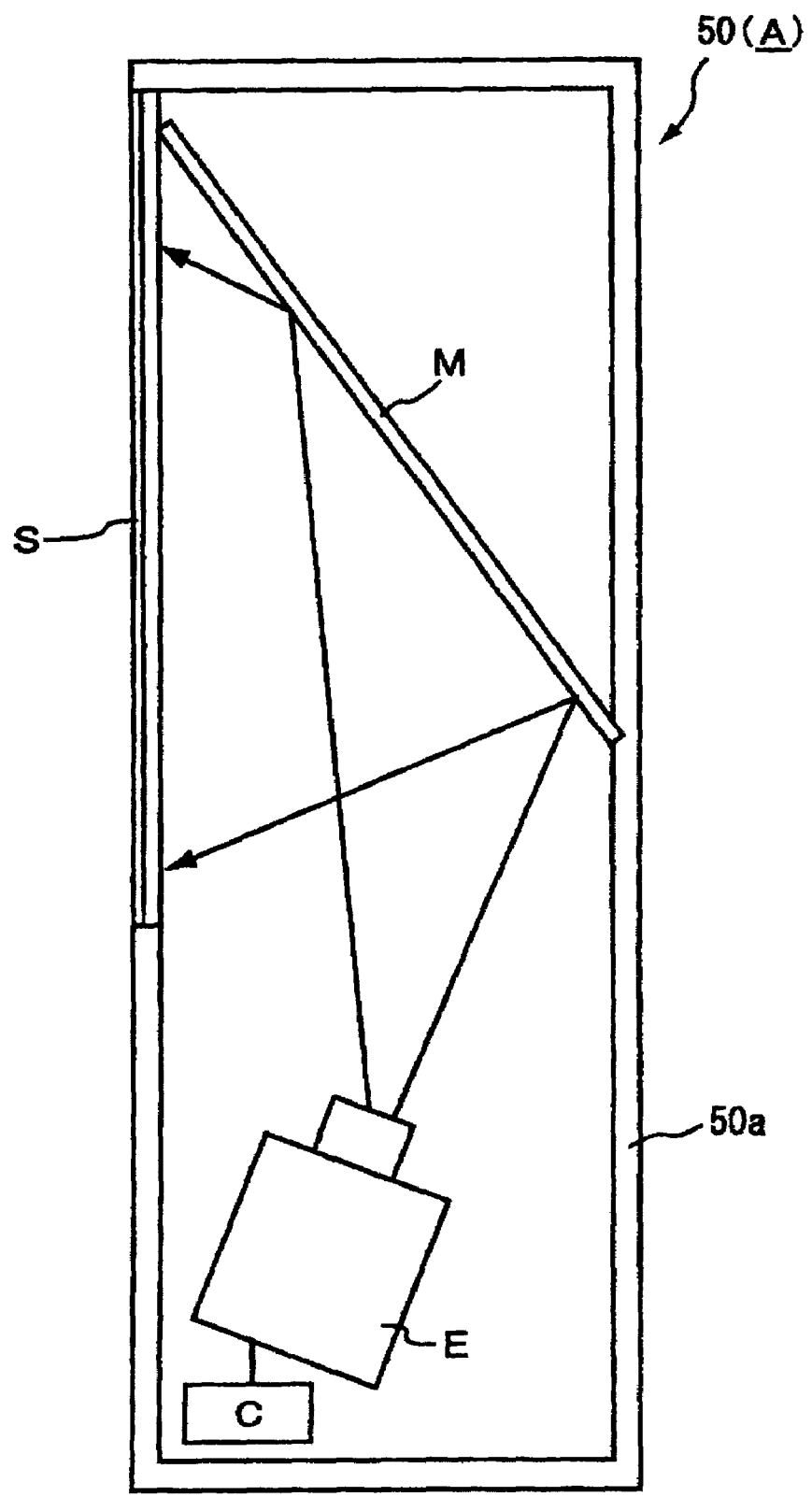
FIG. 5 is a schematic cross sectional view of a rear projection television of the present invention.

FIG. 5 is a schematic cross sectional view of the rear projection television (50) according to the present invention, and is configured by the lighting device (C), the optical engine (E), the reflective mirror (M) accommodated inside the housing (50a), a screen (S) arranged at the front surface and the like. Each color emitted from the projection lens (61) of the optical engine (E) is reflected by the reflective mirror (M) onto the screen (S).

The action of the lighting device (C) for low voltage starter lighting will now be explained according to the timing chart of FIG. 1(b). When the switch (not shown) of the image equipment (A) in which the high pressure discharge lamp (a) is in a light off state is turned ON, the image equipment (A) is operated and the lamp starting is performed. At this point, the direct current output from the direct current stable lighting circuit (21) starts the lighting starter circuit (20) since the discharge lamp (1) is not lighted. A predetermined lighting starting voltage (1 kV to 4 kV for low voltage direct current voltage, 10 kV to 15 kV for high voltage pulse voltage) is then generated and applied to the high pressure discharge lamp (1).

After lamp starting in the above manner, the transition to arc discharge through glow discharge is smoothly performed, and transition to stable lighting is carried out. After a sudden drop once at the initial stage making transition from the glow discharge to the arc discharge, the voltage gradually increases and reaches a predetermined voltage (e.g., 80V). Thereafter, a stable lighting (in this case, rated power=150 W, lamp surface temperature=900° C.) is obtained while maintaining the relevant voltage.

The high pressure discharge lamp (1) is lighted in this manner, but at the same time, the amount of light that passes through each pixel configuring the image element (65R), (65G), (65B) is individually controlled and blocked by the image element controller (70), emitted from the projection lens (61), reflected by the reflective mirror (M) and projected onto the screen (S).

Subsequently, when the switch of the image equipment (A) is turned OFF, the lamp power reducing control signal is output from the lamp power reducing circuit (24) to the power controller (22), and at the same time, the image OFF signal is output from the optical engine control circuit (23) to the image element control circuit (70), so that the image element (65R), (65G), (65B) is in the light blocking state. In this state, the arc discharge scantly continues between the electrodes (3) and (4) of the high pressure discharge lamp (1) as described above, and the light of a certain extent is produced. However, the screen (S) is in the screen OFF state in which the screen (S) is black since the image element (65R), (65G), (65B) is in the light blocking state. The user may then think that the image equipment (A) is switched OFF.

In the transition state, the lamp power reduces to a predetermined value by the power controller (22), the arc discharge is scantly maintained, and the surface temperature of the high pressure discharge lamp (1) gradually lowers through cooling by means of the fan although heat is generated by the arc discharge and finally reaches the equilibrium temperature. The supply of lamp power is cut when the equilibrium temperature is reached, and the light of the high pressure discharge lamp (1) is turned out. The high pressure discharge lamp (1) is then rapidly cooled, and reaches the temperature at which re-lighting is possible within a few seconds. If the switch of the image equipment (A) is turned ON when the high pressure discharge lamp (1) reaches the temperature at which re-lighting is possible, the high pressure discharge lamp (1) is re-lighted in a short period of time according to the above procedures. In the present invention, the equilibrium temperature does not need to be exactly at equilibrium, and may be a state in which the cooling speed of the practice lamp surface is delayed.

In the embodiment of the figure, the reduction time (t2) of the supplied power is when the direct current voltage of 2.4 kV is applied as the starter lighting voltage, where temperature at which re-lighting is possible is 330° C., the equilibrium temperature (upper surface temperature of light emitting tube (12)) by reduced lamp power is 350° C., and the reduction time (t2) to reach the equilibrium temperature is two minutes. The equilibrium temperature and the reduction time (t2) may obviously be changed due to the capacity of the lamp in the cooled state and other conditions. Since the high pressure discharge lamp (1) reaches the equilibrium temperature after the reduction time (t2) has passed, and the temperature does not lower any further, the OFF signal is input to the power controller (22), and the supply of lamp power to the high pressure discharge lamp (1) is cut. The temperature rapidly lowers thereafter, and lowers to the temperature at which re-lighting is possible (330° C.) in about five seconds [waiting time (t1)]. If the switch of the image equipment (A) is turned ON in this state, the high pressure discharge lamp (1) is re-lighted in a short period of time as described above. Further, a stable lighting can be returned in a few seconds through the above method at any time during the reduction time (t2).

Although the equilibrium temperature has been defined with regards to the upper surface temperature of the light emitting tube (12), such measurement is difficult to perform in a practical machine. Therefore the reduction time (t2) is normally defined with time as the parameter as mentioned above. If time is not used, the temperature of the concave reflecting mirror (2) may be measured, and the upper surface temperature of the light emitting tube (12) may be speculated there from.

The change in the light emitting tube (12) when re-lighted from the light off state in the lighting method will now be briefly explained. The light emitting tube (12) of the high pressure discharge lamp (1) in the light off state is in a cooling state, where most of the mercury is pooled in a sphere shape in the light emitting tube (12) and is barely attached to the surface of the electrodes (3), (4). When the starter lighting is started, insulation breakage occurs between the electrodes (3) and (4), and arc is generated between electrodes (3) and (4).

After the formation of a stable arc spot, the lamp voltage increases with evaporation of mercury, and reaches a stable lighting at the rated power after a few minutes. The optical engine (E) is operated while the lighting of the lamp, thereby projecting and displaying images on the screen (S).

Although the user turns OFF the switch of the image equipment (A) when finished with using the image equipment (A), the light of the high pressure discharge lamp (1) is not immediately turned out, and the lamp power reducing control signal is first input to the power controller (22) by the switch OFF. When the lamp power reducing control signal is input, the power controller (22) reduces the output power to the reduced lamp power set in advance, maintains the reduced lamp power over the reduction time (t2), and scantly maintains the arc discharge between the electrodes (3) and (4). Since the high voltage discharge lamp (1) is forcedly cooled during this time, the light emitting tube (12) is cooled to an extent the mercury condenses although the arc portion and the electrodes (3), (4) generating the arc are maintained at high temperature. Thus, the evaporated mercury present at portions other than the arc portion and the portion contacting the surface of the electrodes contacts the inner surface of the cooled light emitting tube (12) and starts to condense thereat.

The lower the reduced lamp power, the lamp temperature can be further lowered and the condensation of the mercury can be made faster, and thus the time until light off can be shortened, but the lamp power in which the arc is not extinguished must be maintained in the transition period. The target power is ½ to 1/20 of the rated power. If the reduced lamp power in the transition period is ½ the rated power, condensation of the mercury evaporation is possible if forced cooling is performed, and if the power is 1/20 the rated power, the possibility of arc extinguishing may arise. Thus, the reduced lamp power of at least greater than or equal to 1/20 is necessary. Normally, the power is about ⅕ the rated power, where the reduced lamp power of about 50 W is supplied if the rated output of the high pressure discharge lamp (1) is 270 W.

Figure 2:
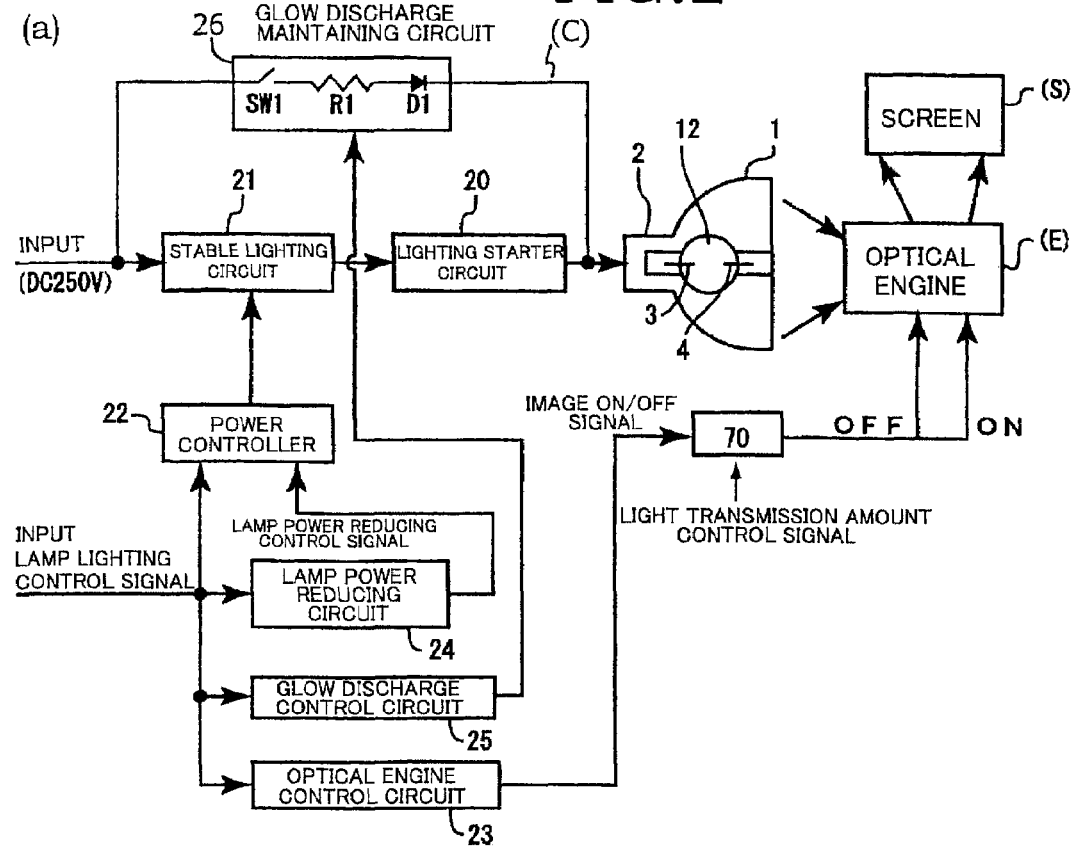
FIG. 2 is a block circuit diagram of a lighting device (second embodiment) applied with the present invention.
Figure 2:
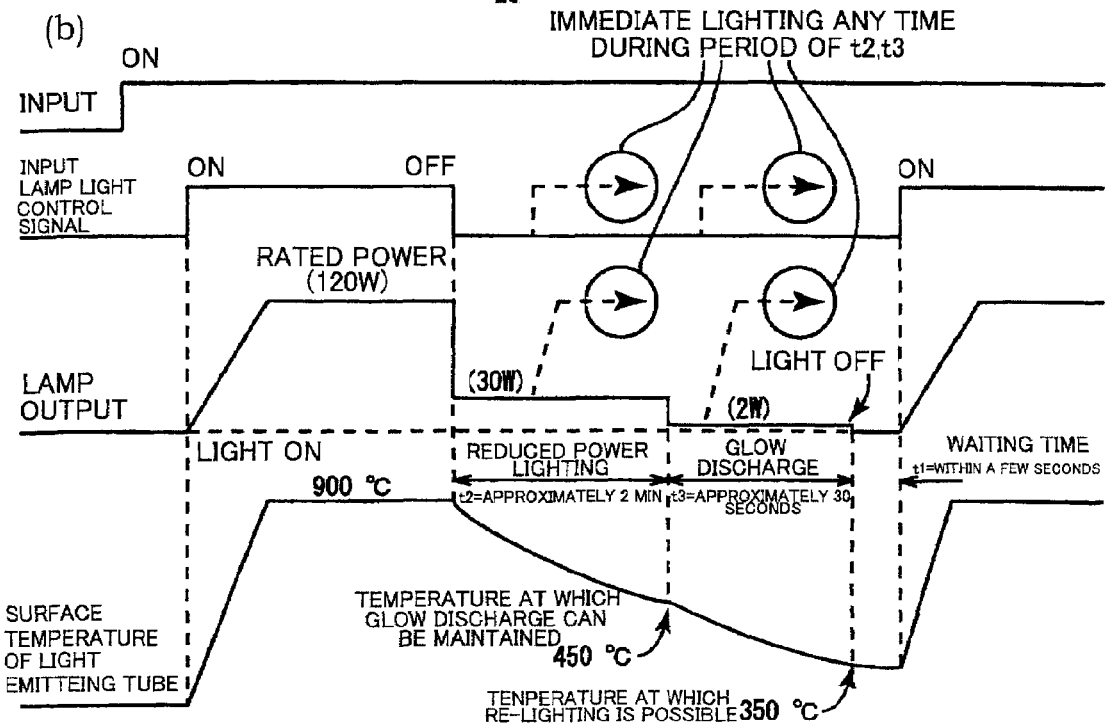
Figure 3:
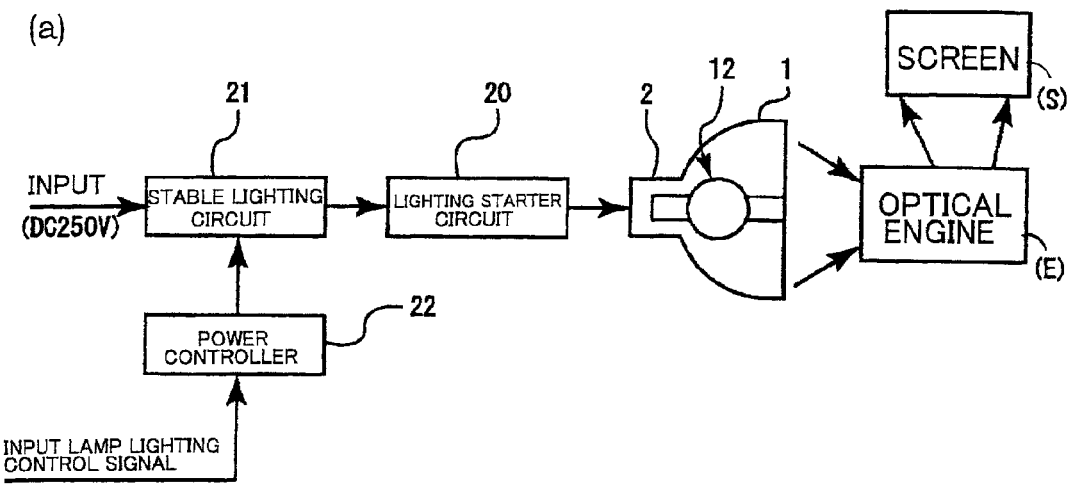
FIG. 3 is a block circuit diagram of a lighting device of the conventional art.
Figure 3:
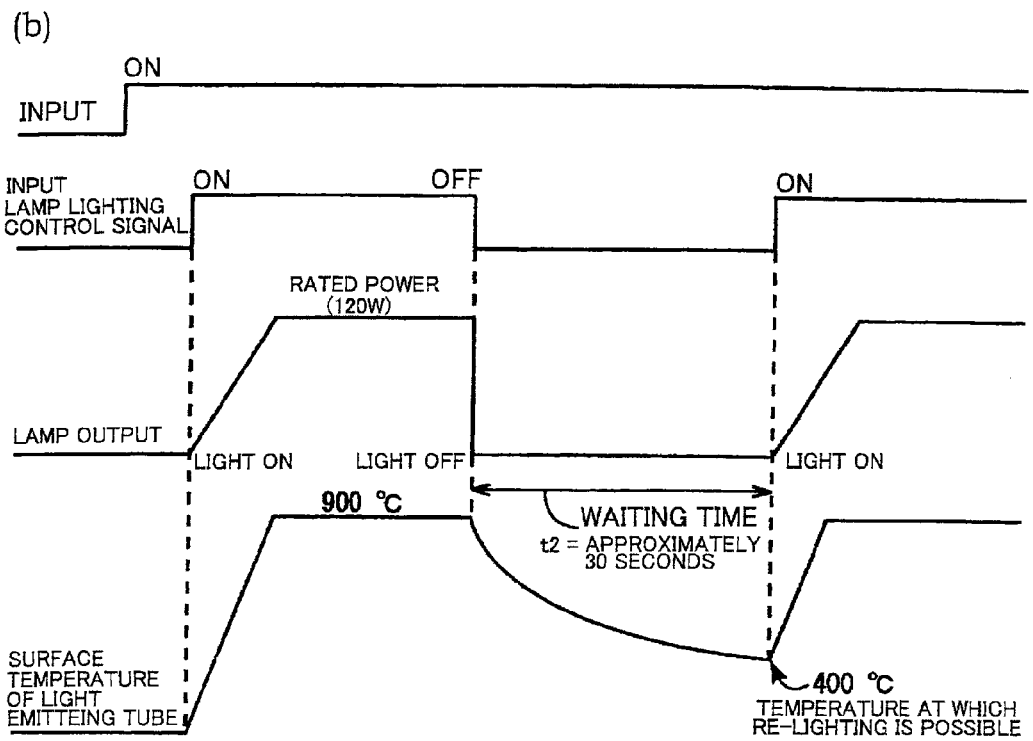

A second embodiment of the present invention will now be described in detail. The aspects common with the first embodiment are omitted, and the explanation of the first embodiment is incorporated. FIG. 2 is a schematic cross sectional view of the high pressure discharge lamp (1) applied with the lighting method of the second embodiment and a block diagram of the application lighting device (C). It is common with the first embodiment in that the high pressure discharge lamp (1) is used attached to the concave reflecting mirror (2), in that the high pressure discharge lamp (1) is either for direct current lighting or alternating current lighting and is applicable in either case, and in that a typical high pressure discharge lamp (1) of 120 W is shown as a representative example for rear projection.

The circuit of the lighting device (C) is configured by the lighting starter circuit (20), the stable lighting circuit (21), the power controller (22), the lamp power reducing circuit (24), the optical engine control circuit (23), the glow discharge maintaining circuit (26) and the glow discharge control circuit (25). The power controller (22), the lamp power reducing circuit (24), the optical engine control circuit (23) and the glow discharge control circuit (25) are input with the lamp lighting control signal to be respectively operated.

Similar to the first embodiment, the lighting starter circuit (20) is connected to the high pressure discharge lamp (1), and acts to apply the starting voltage to the high pressure discharge lamp (1) in lamp starting.

The stable lighting circuit (21) is a circuit, connected to the high pressure discharge lamp (1) by way of the lighting starter circuit (20), for stably lighting the high pressure discharge lamp (1) at the rated power of 120 W etc. in stable lighting, and lowering the lamp power to be supplied to the high pressure discharge lamp (1) in the first half (arc discharge period by reduced power) of the transition period of making transition from the stable lighting to light off (see FIG. 2(a)). The lighting starter circuit (20) is in an operation stopped state in stable lighting.

The power controller (22) is a circuit, connected to the stable lighting circuit (21), for controlling the power so as to stabilize the supply of lighting power from the stable lighting circuit (21) to the high pressure discharge lamp (1), (e.g., in this case, increases the lamp current when lamp voltage decreases at 120 W or vice versa) in stable lighting, and when the high pressure discharge lamp (1) makes transition to the transition period by switch OFF, controls the stable lighting circuit (21) so as to lower the lamp current to be supplied to the high pressure discharge lamp (1) to 30 W etc. when receiving the signal from the lamp power reducing circuit

(24) during the reduced power lighting time (t2) [=first half of transition time] of making transition from stable lighting to glow discharge.

The lamp power reducing control circuit (24) is connected to the power controller (22), and inputs the control signal to the power controller (22) to perform a control to determine the pattern (pattern of dropping to a predetermined power in one stage or multi-stage, or continuously) of reducing the lamp power to be supplied to the high pressure discharge lamp (1), the reduced power lighting time (t2) and the timing of the starting period thereof.

The glow discharge maintaining circuit (26) is connected in parallel with the lighting starter circuit (20) and the stable lighting circuit (21) that are connected in series, and is configured by connecting in series the switch (SW1), the resistor (R1) and the diode (D1) in such order by way of example. The output side of the diode (D1) is connected to one terminal of the high pressure discharge lamp (1), where the input voltage (e.g., DC250V) is applied to the high pressure discharge lamp (1) by way of the glow discharge maintaining circuit (26) when the switch (SW1) is turned ON. In order to make transition to the glow discharge, when for example, the stable lighting circuit (21) is stopped, the glow current that is current limited at the resistor (R1) is supplied to the high pressure discharge lamp (1) and transition from the reduced arc discharge to the glow discharge occurs, and the glow discharge is maintained.

The glow discharge control circuit (25) is connected to the glow discharge maintaining circuit (26) and the signal from the glow discharge control circuit (25) is input to the glow discharge maintaining circuit (26) to control the glow discharge time (t3) and the timing of making transition from the arc discharge to the glow discharge.

The optical engine control circuit (23), connected to the optical engine (E) by way of the image element controller (70), controls the optical engine (E) so that the image does not appear on the screen (S) at the same time as when the high pressure discharge lamp (1) enters the transition period by the switch OFF of the image equipment (A), controls the optical engine (E) so as to return the screen (S) to a state in which the image appears after the transition period (t2+t3) or the first half (t2) of the transition period has elapsed, and controls the optical engine (E) so that the image is output from the optical engine (E) at the same time as when the switch of the image equipment (A) is turned ON.

The image element controller (70) is arranged between the optical engine (E) and the optical engine controller (23), and controls the amount of light passing through the optical engine (E) including turning ON/OFF by the signal from the optical engine control circuit (23).

The power controller (22) is input with the lamp lighting control signal (include ON/OFF) for performing lighting control of the high pressure discharge lamp (1), and the lamp power reducing control signal for controlling the stable lighting circuit (21) so as to lower the output power to be supplied to the high pressure discharge lamp (1) to the reduced lamp power to an extent the arc discharge between the electrodes (3) and (4) is not extinguished in the first half (t2) of the transition state of making transition from the stable lighting to the glow discharge.

The optical engine (E) as well as the rear projection television (50) applied with the second embodiment are common with the first embodiment.

The action of the lighting device (C) according to the second embodiment by the direct current starting voltage will now be explained according to the timing chart of FIG. 2(b). When the switch (not shown) of the image equipment (A) in which the high voltage discharging lamp (1) is in the light off state is turned ON, the image equipment (A) is operated and lamp starting is performed. At this point, the direct current output that is output from the direct current stable lighting circuit (21) starts the lighting starter circuit (20) since the discharge lamp (1) is not lighted. A predetermined lighting starting voltage (1 kV to 4 kV for direct current starting voltage, 10 kV to 15 kV for high voltage pulse starting voltage) is then generated and applied to the high pressure discharge lamp (1).

After lamp starting in the above manner, the transition to arc discharge through glow discharge is smoothly performed, and transition to stable lighting is carried out. After a sudden drop once at the initial stage making transition from the glow discharge to the arc discharge, the voltage gradually increases and reaches a predetermined voltage (e.g., 80V). Thereafter, a stable lighting (in this case, rated power=120 W, lamp surface temperature=about 900° C.) is obtained while maintaining the relevant voltage.

The high pressure discharge lamp (1) is lighted in this manner, but at the same time, the amount of light that passes through each pixel configuring the image element (65R), (65G), (65B) of the optical engine (E) is individually controlled and blocked by the image element controller (70), emitted from the projection lens (61), reflected by the reflective mirror (M), and projected onto the screen (S), (see FIG. 4).

Subsequently, when the switch of the image equipment (A) is turned OFF, the lamp power reducing control signal is output from the lamp power reducing circuit (24) to the power controller (22), and at the same time, the image OFF signal is output from the optical engine control circuit (23) to the image element control circuit (70), so that the image element (65R), (65G), (65B) is in the light blocked state. In this state, the arc discharge scantly continues between the electrodes (3) and (4) of the high pressure discharge lamp (1) as explained above, and the light of a certain extent is produced. However, the screen (S) is in the screen OFF state in which the screen is black since the image element (65R), (65G), (65B) is in the light blocked state. The user may then think that the image equipment (A) is switched OFF.

In the first half (t2) of the transition state, the lamp power reduces to a predetermined value (a case of constant value at 30 W is shown) by the power controller (22) and the arc discharge is scantly maintained. However, the surface temperature thereof gradually lowers, and the high pressure discharge lamp (1) makes transition to glow discharge after the time (t2) [about two minutes in the figure] at which determination is made that the temperature capable of maintaining glow discharge (about 450° C. in the figure) is reached has elapsed. The high pressure discharge lamp (1) is thus rapidly cooled, and the glow discharge maintaining circuit (26) is shut off after elapse of a predetermined time (t3), thereby turning out the light of the high pressure discharge lamp (1).

(t3) is a time at which determination can be made that temperature at which re-lighting is possible has been reached, and the high pressure discharge lamp (1) is instantaneously re-lighted when the switch of the image equipment (A) is turned ON again. A case of when the lamp reduced power is 30 W is shown by way of example, but the reducing method may be for reducing the power in a step wise manner (e.g., 30 W, 25 W, 20 W). That is, as the lamp temperature lowers, the pressure inside the lamp lowers, thereby allowing the arc to be maintained at a lower power, and effectively lowering the lamp temperature. Alternatively, similar effects are obtained even if the power is continuously lowered with time from 30 W to 20 W.

The operation of the glow discharge maintaining circuit is shown as one example for 2 W. The glow current is set at the resistor (R1). For instance, when glow voltage=200V, input voltage=250V, and R1=5 kΩ, the glow current=about (250V-200V)/5 kΩ=10 mA. The power of glow discharge becomes 200V×10 mA=2 W.

In the embodiment shown in the figure, a case of when the glow discharge maintaining time (t3) is about 30 seconds is given as the time for the upper surface temperature of the light emitting tube (12) that can be re-lighted to reach 350° C. when the direct current starting voltage of typically 2.4 kV is applied. The glow discharge maintaining time (t3) can obviously be changed by the capacity of the lamp in the cooled state, the value of the direct current starting voltage, and other conditions. Thereafter, the glow discharge maintaining circuit (26) is shut off, so that the supply of lamp power to the high pressure discharge lamp (1) is cut and the light of the high pressure discharge lamp (1) is turned out. When the switch of the image equipment (A) is turned ON in this state after an appropriate time, the high pressure discharge lamp (1) is re-lighted again within a few seconds, as described above. Further, since discharge is performed even scantly between the power reduction time (t2) and the glow discharge maintaining time (t3), the stable lighting is returned any time by the above described method.

Although the equilibrium temperature has been with regards to the upper surface temperature of the light emitting tube (12), and the reduction time (t2) and the glow discharge maintaining time (t3) are normally defined with the time as the parameter as mentioned above since such measurement is difficult to perform in a practical machine, if time is not used as parameter, the temperature of the concave reflecting mirror (2) may be measured, and the upper surface temperature of the light emitting tube (12) may be speculated there from.

The present invention is revolutionary in that the high pressure discharge lamp that could not have been re-lighted instantaneously or in a short period of time can be re-lighted instantaneously or in a short period of time. Thus, it becomes essential as a light source for the large image equipments particularly, for rear projection television, which development is globally expected, and is a product which becomes a key to the development of such large image equipments.

The invention claimed is:

1. A method of lighting a high pressure discharge lamp, comprising the steps of:
   (a) reducing power to be supplied to electrodes of the lamp to an extent an arc discharge is not extinguished for a while (period (t2)) in a transition state of making transition from a lighted state to light off;
   (b) making transition to a glow discharge;
   (c) maintaining for a while (period (t3)); and
   (d) cutting the power supply to the electrodes.

2. A method of lighting a high pressure discharge lamp used as a light source of image equipment, comprising the steps of:
   (a) making a state in which an image does not appear on a screen by switching OFF the image equipment;
   (b) reducing power to be supplied to electrodes of the lamp to an extent an arc discharge is not extinguished for a while (period (t2));
   (c) making transition to a glow discharge;
   (d) maintaining for a while (period (t3)); and
   (e) cutting the power supply to the electrodes.

3. The method of lighting the high pressure discharge lamp according to claim 1 or 2, wherein the reducing amount of the power is ½ to ¹/₂₀ of a rated output, and the power after reduction is constant, or reduced a stepwise manner with time, or reduced continuously with time.

4. The method of lighting the high pressure discharge lamp according to claim 1 or 2, wherein the reduction time (t2) of the reduced power is 20 to 240 seconds.

5. The method of lighting the high pressure discharge lamp according to claim 1 or 2, wherein:
   (a) the reducing amount of the power is ½ to ¹/₂₀ of a rated output;
   (b) the power after reduction is constant, or reduced a stepwise manner with time, or reduced continuously with time; and
   (c) the reduction time (t2) of the reduced power is 20 to 240 seconds.

6. The method of lighting the high pressure discharge lamp according to claim 1 or 2, wherein the glow discharges maintaining time (t3) is 10 to 120 seconds.

7. The lighting method of the high pressure discharge lamp according to claim 1 or 2, wherein:
   (a) reducing amount of the lamp power is ½ to ¹/₂₀ of a rated output;
   (b) the power after reduction is constant, or reduced a stepwise manner with time, or reduced continuously with time; and
   (c) the glow discharge maintaining time (t3) is 10 to 120 seconds.

8. The method of lighting the high pressure discharge lamp according to claim 1 or 2, wherein:
   (a) the reduction time (t2) of the reduced power is 20 to 240 seconds; and
   (b) the glow discharge maintaining time (t3) is 10 to 120 seconds.

9. A lighting device of a high pressure discharge lamp, comprising:
   (a) a lighting starter circuit for starter lighting by applying a high voltage pulse or a low voltage of direct current to the high pressure discharge lamp;
   (b) a stable lighting circuit, connected to the lighting starter circuit, for stably lighting the high pressure discharge lamp;
   (c) a power controller for controlling the power supply from the stable lighting circuit to the high pressure discharge lamp;
   (d) a lamp power reducing control circuit for having the power controller control the stable lighting circuit so that a stable supply of the lighting power from the stable lighting circuit to the high pressure discharge lamp is performed in stable lighting, and control the stable lighting circuit so as to lower the power to be supplied to the high pressure discharge lamp to a power of an extent an arc discharge between electrodes is not extinguished in a transition state when the high pressure discharge lamp makes transition from the stable lighting to light off after switching OFF the image equipment; and
   (e) an optical engine control circuit for outputting an image OFF signal to an optical engine for sending images to a screen so as to have the screen in a state in which the image does not appear at the same time as the switch OFF.

10. A device of lighting a high pressure discharge lamp, comprising:
    (a) a lighting starter circuit, connected to the high pressure discharge lamp, for starter lighting by applying a high voltage pulse starting voltage or a direct current starting voltage to the high pressure discharge lamp;

(b) a stable lighting circuit, connected to the lighting starter circuit, for stably lighting the high pressure discharge lamp;
(c) a power controller, connected to the stable lighting circuit, for controlling the power supply from the stable lighting circuit to the high pressure discharge lamp;
(d) a lamp power reducing circuit, connected to the power controller, for having the power controller control the stable lighting circuit so that a stable supply of the lighting power from the stable lighting circuit to the high pressure discharge lamp is performed in stable lighting, and control the stable lighting circuit so as to lower the power to be supplied to the high pressure discharge lamp to power of an extent an arc discharge between electrodes is not extinguished in a first half of a transition state of when the high pressure discharge lamp makes transition from the stable lighting to light off;
(e) a glow discharge maintaining circuit, connected to the high pressure discharge lamp, for making transition the high pressure discharge lamp to glow discharge in a second half of the transition state and maintaining the glow discharge after transition; and
(f) a glow discharge control circuit, connected to the glow discharge maintaining circuit, for maintaining the glow discharge and cutting the power supply to the electrodes after maintaining the glow discharge.

11. The device of lighting the high pressure discharge lamp according to claim 9, wherein the high voltage pulse starting voltage is 10 kV to 15 kV.

12. The device of lighting the high pressure discharge lamp according to claim 9; wherein the direct current starting voltage is 1 kV to 4 kv.

13. An image equipment, comprising:
(a) a screen arranged in the image equipment for showing a image;
(b) an optical engine for projecting the image on the screen;
(c) a high pressure discharge lamp for supplying light to the optical engine;
(d) a lighting starter circuit, connected to the high pressure discharge lamp, for applying the starter lighting voltage to the high pressure discharge lamp;
(e) a stable lighting circuit, connected to the lighting starter circuit, for supplying a stable lighting power to the high pressure discharge lamp in stable lighting of the high pressure discharge lamp;
(f) a power controller, connected to the stable lighting circuit, for controlling the power supply from the stable lighting circuit to the high pressure discharge lamp;
(g) an optical engine control circuit, connected to an optical engine, for controlling the optical engine by switching OFF of the image equipment to have the screen in a state in which an image does not appear;
(h) a lamp power reducing circuit, connected to the power controller, for reducing the power to an extent an arc discharge is not extinguished by cooling the lamp after the switch OFF and maintaining the arc discharge for a while (period (t2));
(i) a glow discharge maintaining circuit, connected to the high pressure discharge lamp, for making transition from the arc discharge by the reduced power to the subsequent glow discharge and maintaining the glow discharge; and
(j) a glow discharge control circuit, connected to the glow discharge maintaining circuit, for controlling the glow discharge maintaining circuit and cutting the current supply to the electrodes after maintaining the glow discharge for a while (period (t3)).

\* \* \* \* \*